United States Patent
Andersen et al.

(10) Patent No.: US 9,416,885 B2
(45) Date of Patent: Aug. 16, 2016

(54) LOW PROFILE VALVES

(75) Inventors: Cameron Andersen, Spanish Fork, UT (US); Jared Mangum, Highland, UT (US); Garth L. Mason, Springville, UT (US); Kenneth John Stoddard, Santaquin, UT (US); Tyson R. Messick, Highland, UT (US)

(73) Assignee: Schlumberger Technology Corporation, Sugar Land, TX (US)

( * ) Notice: Subject to any disclaimer, the term of this patent is extended or adjusted under 35 U.S.C. 154(b) by 732 days.

(21) Appl. No.: 13/481,241

(22) Filed: May 25, 2012

(65) Prior Publication Data

US 2013/0312851 A1    Nov. 28, 2013

(51) Int. Cl.
*F16K 15/03* (2006.01)
*F16K 17/04* (2006.01)
*F16K 27/02* (2006.01)

(52) U.S. Cl.
CPC .......... *F16K 15/033* (2013.01); *F16K 17/0413* (2013.01); *F16K 27/0209* (2013.01); *Y10T 137/0491* (2015.04); *Y10T 137/7922* (2015.04)

(58) Field of Classification Search
CPC .............. F16K 15/033; F16K 17/0413; F16K 27/0209; Y10T 137/7922; Y10T 137/0491
USPC .......... 166/325, 326; 137/535, 537, 879, 230, 137/224
See application file for complete search history.

(56) References Cited

U.S. PATENT DOCUMENTS

| | | | | |
|---|---|---|---|---|
| 1,793,193 | A | * | 2/1931 | Price .............................. 166/325 |
| 1,854,518 | A | * | 4/1932 | Little ............................. 166/326 |
| 1,934,571 | A | * | 11/1933 | Sutton ............................ 137/224 |
| 2,191,778 | A | * | 2/1940 | Swart ............................. 166/326 |
| 2,257,765 | A | * | 10/1941 | Scaramucci .................... 166/326 |
| 2,374,169 | A | * | 4/1945 | Martin ........................... 166/147 |
| 2,610,028 | A | * | 9/1952 | Smith ............................. 166/325 |
| 3,059,699 | A | * | 10/1962 | Brown ........................... 166/326 |
| 3,910,305 | A | * | 10/1975 | Hughes .......................... 137/224 |
| 4,064,897 | A | * | 12/1977 | Weber ............................ 137/224 |
| 5,425,424 | A | | 6/1995 | Reinhardt et al. |
| 5,845,669 | A | | 12/1998 | Ross |
| 5,931,190 | A | * | 8/1999 | Engstrom ...................... 137/535 |
| 6,513,594 | B1 | | 2/2003 | McCalvin et al. |
| 6,550,541 | B2 | | 4/2003 | Patel |
| 6,808,020 | B2 | | 10/2004 | Garcia et al. |
| 7,360,602 | B2 | | 4/2008 | Kritzler et al. |

(Continued)

OTHER PUBLICATIONS

Examination Report issued in AU2013205979 on Feb. 25, 2015, 3 pages.

(Continued)

*Primary Examiner* — Kevin Lee
*Assistant Examiner* — P. Macade Nichols
(74) *Attorney, Agent, or Firm* — Michael Stonebrook

(57) ABSTRACT

Low profile valves are described. In an embodiment, a tubular member for fluid transport has a valve constructed within a wall of the tubular member for controlling a radial flow of fluid, such as water, oil, or gas, through the wall without impeding the flow of fluid or tools through the tubular member or near the exterior of the tubular member. The low profile valve may be used, for example, in the oil and gas industries as a pressure relief valve or check valve. When used as a pressure relief valve, a load member such as a spring, strap, or rocker arm maintains a backpressure on the valve. Example low profile valves can provide flow control from within a very thin annulus between other components.

20 Claims, 5 Drawing Sheets

(56) References Cited

U.S. PATENT DOCUMENTS

| | | |
|---|---|---|
| 7,640,990 B2 | 1/2010 | Ross et al. |
| 7,647,975 B2 | 1/2010 | Messick et al. |
| 7,866,401 B2 | 1/2011 | McCalvin |
| 7,926,572 B2 | 4/2011 | Erkol et al. |
| 2009/0266557 A1 | 10/2009 | Goughnour et al. |
| 2010/0108326 A1 | 5/2010 | Messick et al. |
| 2011/0127043 A1 | 6/2011 | Hahn et al. |
| 2012/0227839 A1* | 9/2012 | Veit ............................... 137/538 |
| 2012/0273227 A1* | 11/2012 | Morrison ...................... 166/325 |

OTHER PUBLICATIONS

Official Action issued in MX/a/2013/005935 on May 26, 2015, 8 pages.

* cited by examiner

LOW PROFILE VALVES

BACKGROUND

In oil and gas wells, production tubing brings fluid hydrocarbon resources to the surface. Conventional flapper valves are sometimes used in the production tubing when an open cross-section of the tubing is required for axial travel of the fluid resource being produced or for tool strings to be passed through the production tubing. The moving parts of the flapper valve can fold away out of the main cross-sectional bore of the tubing and lie against an inner wall to maximize the cross-sectional area available for tools or fluid flow to pass through. These conventional flapper valves open and close the main bore of the production tubing in order to control the axial flow. Other types of valves are also used to control flow through the main bore of oilfield production tubing.

SUMMARY

Low profile valves are described. In an embodiment, a tubular member for fluid transport has a valve constructed within its wall. The embedded valve can provide flow control from within a very thin annulus between other components without impeding an axial flow of the fluid through the tubular member. A low profile valve may be used, for example, in the oil and gas industries as a pressure relief valve or check valve. This summary section is not intended to give a full description of low profile valves. A detailed description with example embodiments follows.

DETAILED DESCRIPTION

Overview

This disclosure describes low profile valves. In the description below, each element or component of a low profile valve may be replaced by numerous equivalent alternatives, some of which are disclosed in the specification. A low profile valve is used in cylindrical applications where the entire valve fits within the wall thickness of an annular member, such as a segment of oilfield production tubing, to avoid interference with internal and external moving fluids and parts. In an implementation, the low profile valve includes a valve member, such as a disc or poppet that engages a seat to allow flow in one direction. The motion of the valve member can be controlled, for example, by a circumferential strap or a pivoting rocker arm, which can be spring-loaded or energized by other means to create a specified backpressure across the valve. The poppet may utilize an elastomeric seal to improve performance.

Example Systems

Figure 1:
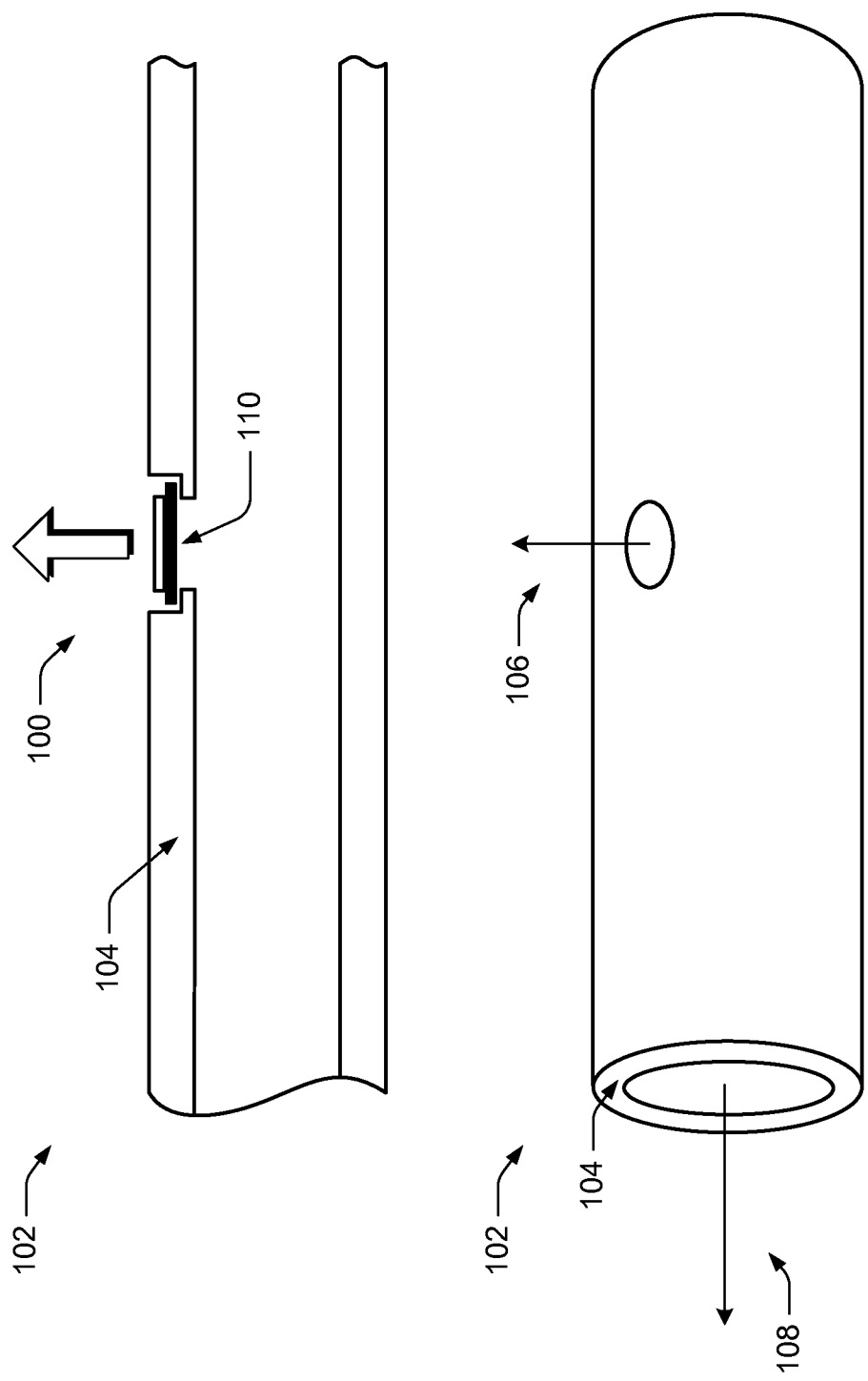
FIG. 1 is a diagram of a fluid transporting tube with an example low profile valve.

As shown in FIG. 1, an example low profile valve 100 for use with production tubing 102 in the oil and gas industries resides substantially within the wall 104 of an annular member, such as at least part of a valve casing, a tube (tubing 102), a pipe coupling, a pipe joint, or other cylindrical member to be including in a tubing string, pipe string, or surface network. "String" as used herein means multiple pieces connected end-to-end. Production tubing 102, as described herein, can be located in a well below ground or can be in a surface transport system above ground.

Because the low profile valve 100 remains in an annular space envelope within the confines of a wall 104 of a tube 102 or other cylindrical member, the valve 100 does not interfere with the main fluid flow or passage of tools through the tubing 102 or tubing connections, but instead controls a radial flow 106 through the tubing 102. "Radial flow 106" as used herein, as opposed to axial flow 108 along the main bore of the production tubing 102, means flow in or out of the tubing 102 through the wall 104. The low profile valve 100 can be made thin in order to allow the wall thickness of the tubing 102 to be made correspondingly thin. The valve design allows control of fluid flow from within a tight annular envelope.

Depending on embodiment, the flow control can be, for example, that of a simple check valve or that of a pressure relief valve. An example low profile valve 100 controls a flow between the inside of tubing 102 and the exterior of the tubing 102. For example, the low profile valve 100 may open at a certain set point to relieve excess pressure in the tubing 102, which may be caused by pressurized liquid, gas, or a mixture of both. Although the low profile valves 100 described herein relate to oil and gas wells and the related tubing 102 and casings used therein, the low profile valves 100 may find application in other industries.

Low profile valves 100 may use different configurations and materials to achieve a valve seal (hereinafter, just "seal"). Example valves 100 may use a valve member, such as a disc, gate, or poppet 110. A poppet 110 can be a round, oval, mushroom-shaped, or irregularly-shaped member that closes against a hole, port, or circular seat in the wall 104 of the tubing 102. For example, the valve member may be a tapered plug or stopper to be lifted on and off (or in and out) of the seat around a port opening. An example poppet 110 may be constructed out of steel, elastomer bonded to steel, or completely out of a plastic. In some applications a pliable O-ring may be used as part of the poppet 110 or seat to seal the moveable poppet 110 as it contacts the port. The seat or seal interface may also be made of elastomeric surfaces, a metal-on-metal interface, etc. A metal-on-metal seal may use tapered, flared, or ground mating surfaces. A metal-on-metal seal does not have to be precise if the particular application allows for a negligible amount of leakage through the seal.

Figure 2:
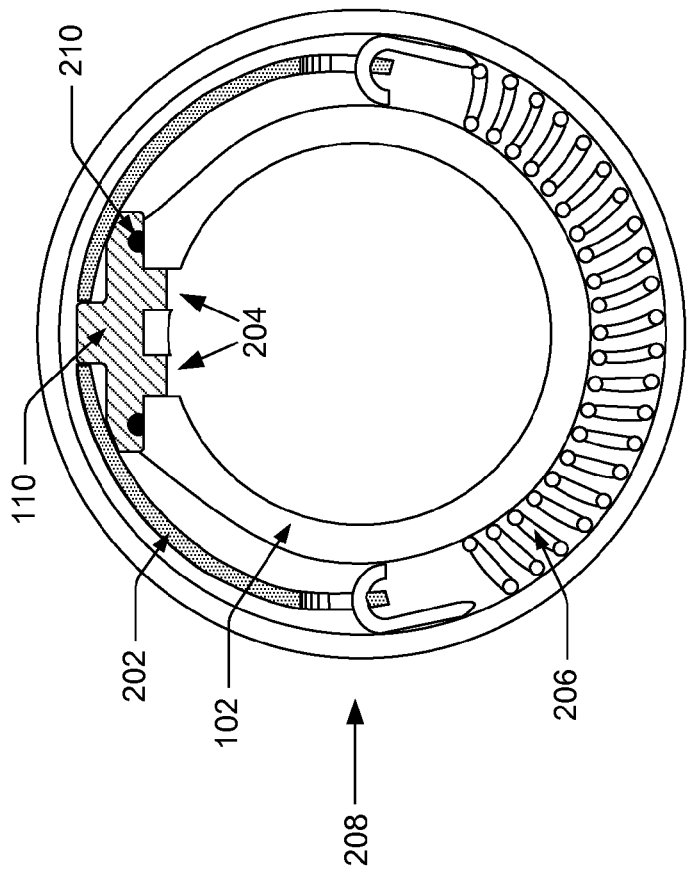
FIG. 2 is a cross-sectional diagram of an example strap-style low profile valve.

FIG. 2 shows an example embodiment of a strap-style valve 200, in which an optional loading mechanism provides stored energy (spring or otherwise) to apply a preload on the poppet 110 to assist in forming a positive seal. The strap 202 secures the poppet 110 to make a one-way valve in closed position against the port 204. In a pressure-relief embodiment, the strap 202 applies force to the poppet 110 to keep the poppet 110 in place until a certain pressure is reached inside the tubing 102. The strap 202 itself may be slightly elastic to allow the poppet 110 some movement, or the strap 202 may be inelastic and the force on the poppet 110 maintained by a spring 206 connected to the strap 202. A spring-loaded strap 202 near the outer diameter of a cylindrical assembly 208 can be used to exert radial forces on the poppet 110 or other valve member. For example, the spring may exert a force of approximately 20-30 pounds over the surface area of the poppet 110 used. In one example, this results in a 250-300 psi pressure relief valve.

A seal 210, such as an O-ring, may provide a seating surface, or the seating surface may be elastomeric or metal-on-metal, for example, as introduced above. When pressure inside the tubing 102 reaches a certain point that is greater than the force holding the poppet 110, the low profile valve 100 opens, releasing the excess pressure.

Depending on embodiment, the placement of the low profile valve 100 can allow fluid to flow unidirectionally with respect to the tubing wall 104. Thus, a low profile valve 100 can also be placed as a one-way valve to let pressurized external fluid into the inner bore of the production tubing 102, and confine it there. A valve 100 that includes a cylindrical body (or "cylindrical assembly") 208, radial port 204, sealing poppet 110, and optionally, a mechanism for applying a preload force to the poppet 110 allows for control of radial flow 106 in or out of the radial port 204 of the cylindrical assembly 208.

The cylindrical assembly 208 can be of any practical size, but in one embodiment the cylindrical assembly 208 matches a popular conventional tool size for artificial lift components, such as standard API 2⅜ inch outside diameter; 8-round production tubing 102. The cylindrical assembly 208 can include a coupling with male and female ends that also has the radial port 204 to allow flow in or out of the cylindrical assembly 208 through a wall 104. The cylindrical assembly 208 also hosts the seat for receiving the valve member, such as poppet 110, and making a fluid-tight seal.

The poppet 110 can be a small valve member that uses, e.g., an O-ring, metal-on-metal, or elastomeric seal to prevent flow until the valve 100 is actuated. An elastomeric seal can be attached to the poppet 110 or alternatively be part of the cylindrical assembly 208.

The cylindrical assembly 208, sealing poppet 110, and optional loading mechanism (strap 202, spring 206) form a complete low profile valve 100. In one application, the low profile valve 100 functions as a burp valve to regulate the pressure of a downhole oil reservoir. During use, excess internal fluid is released through the valve 100 without allowing ingression of external fluids.

Figure 3:
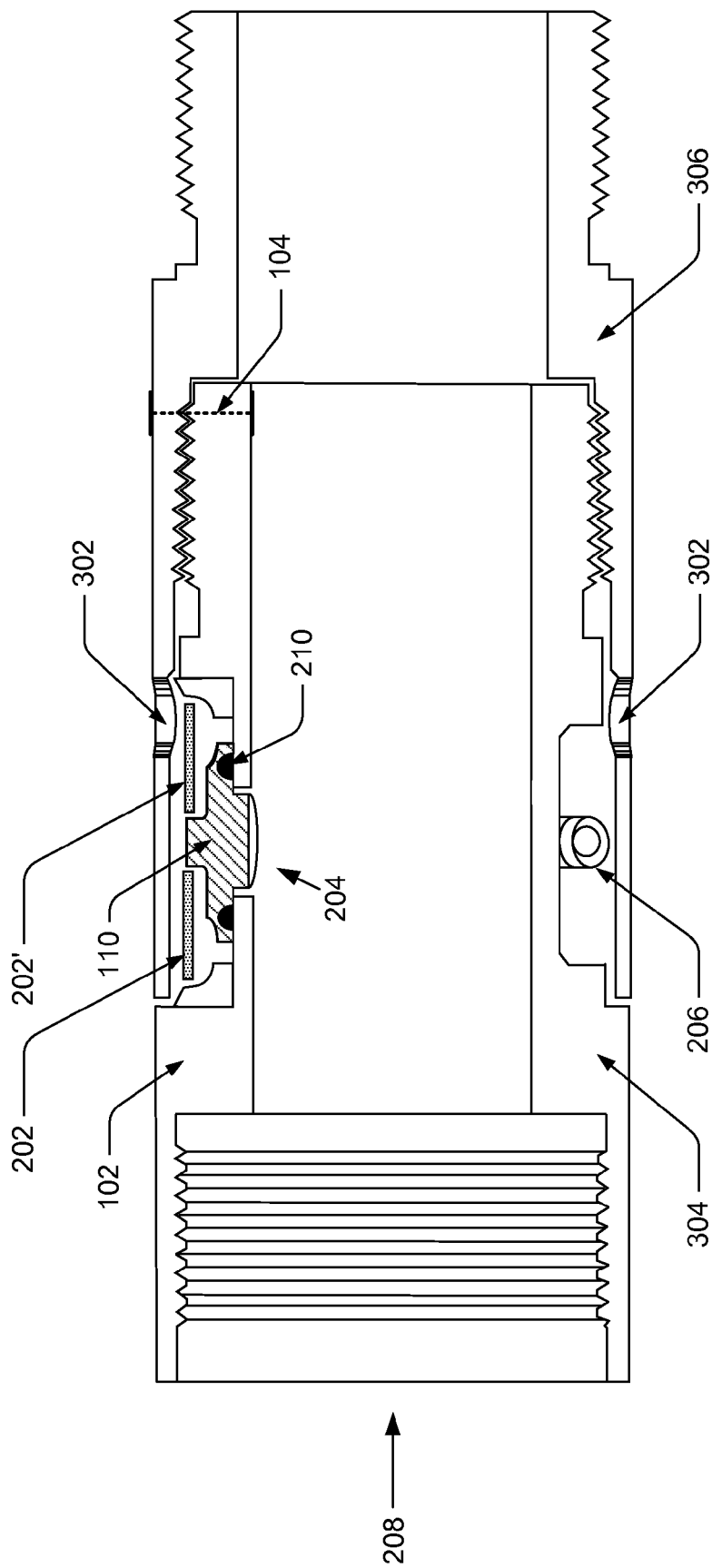
FIG. 3 is a longitudinal section of an example strap-style low profile valve.

FIG. 3 shows a longitudinal section 300 of the strap-style valve 200 constructed within the cylindrical assembly 208 shown in FIG. 2, including the poppet 110, seal 210, strap 202, and spring 206. In an embodiment, two (or more) straps 202 (202') may be used to better distribute the holding force on the valve member or poppet 110 or to increase the force on the poppet 110 by employing two or more springs 206 or other tensioning devices side-by-side.

The poppet 110 or other valve member does not have to move very far to allow fluid that is inside the tubing 102 to move through the tubing wall 104 to the outside. Because the poppet 110 or other valve element may not move much, all the components of the low profile valve 100 are able to remain within the annular profile of the tubing wall 104. Moreover, one or more guards or shields may be positioned near the poppet 110 to minimize contamination and damage to the valve from outside particulates.

In an embodiment, the cylindrical assembly 208 can be made of two threaded tubular components, which when threaded together form the unified cylindrical assembly 208 with an annular space envelope inside a wall of the cylindrical assembly 208 for the valve. Thus, the cylindrical assembly 208 may be constructed from one, from two, or from multiple tubing sections in order to build the low profile valve 100 within the walls of the cylindrical assembly 208. For example, a first threaded section 304 and a second threaded section 306 can be threaded together during construction or separated as desired in order to assemble the valve components inside an annular space or envelope. Ports 302 can be included in at least one of the sections (e.g., 306) to allow radial flow 106, such as a pressure release, when the low profile valve 100 is actuated. The cylindrical assembly 208 can then be threaded, for example, into the tubing string 102 for a well or surface production network.

Figure 4:
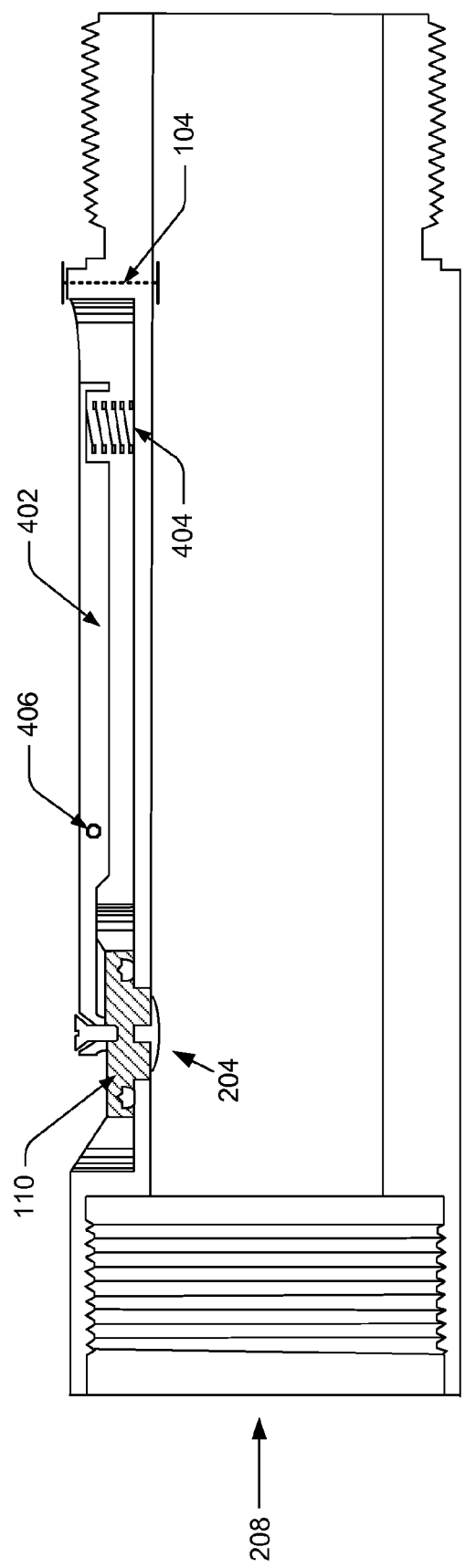
FIG. 4 is a longitudinal section of an example rocker-style low profile valve.

FIG. 4 shows a longitudinal section of a rocker-style low profile valve 100. In this embodiment of the low profile valve 100, the cylindrical assembly 208' has a space built into a wall thickness 104 in which the valve components can be situated. A valve member, such as a gate, plug, or poppet 110 seats on a port 204 made through the wall thickness 104. Tension or preload force on the example poppet 110 can be provided by the stiffness of a rigid arm 402 attached to the cylindrical assembly 208 at the other end of the arm 402 from the poppet 110. The arm 402 is then bent slightly by the poppet 110 when pressure from inside the bore 404 of the cylindrical assembly is great enough to overcome the preload force and move the poppet 110. Or, a spring-loaded arm 402 may be leveraged at a pivot point 406 and pressure applied to the poppet 110 by a spring 408.

The preload force applied to the poppet 110 can be selected by adjusting the length and relative stiffness of the bendable arm 402 or by changing the pivot point 406, arm length, or strength of the spring 408 in a spring-loaded arm 402.

In an embodiment, the low profile valve 100 has no loading mechanism, but functions as a unidirectional check valve with an effective actuation pressure of zero. In this application, the low profile valve 100 just acts to prevent backflow. Such embodiments and others can be used as check valves to allow unidirectional flow from positive displacement pumps, motors, and other tools. Oilfield tools or equipment that use radial check valves can benefit from the variable operation and low profile design of the low profile valve 100, when flow control from within a very tight annulus between other components is desired.

In an embodiment, a valve gate slides within a slot in the wall 104 of a tube 102 or cylindrical member to open and close a port through a wall of the tube 102. That is, the valve gate slides across the port opening, instead of moving perpendicularly to the main axis of the tube 102.

Example Method

Figure 5:
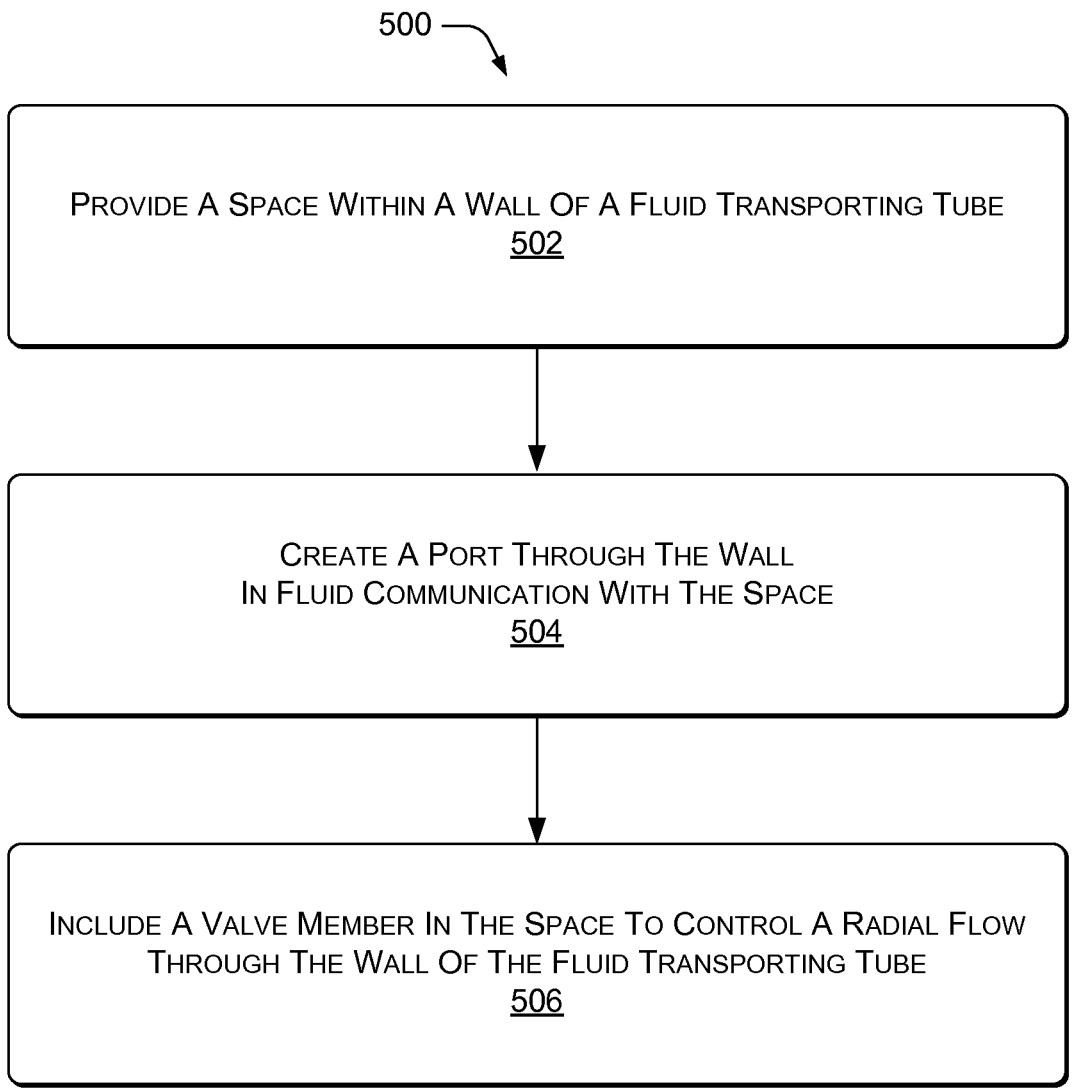
FIG. 5 is a flow diagram of an example method of constructing a low profile valve.

FIG. 5 shows an example method 500 of constructing a low profile valve. In the flow diagram, the operations are summarized in individual blocks.

At block 502, a space is provided within a wall of a tube for transporting a fluid. The tube may be a cylindrical member, such as cylindrical assembly 208, which can be disassembled in order to access the space. Such a cylindrical member may have end threads or other connectors so that the cylindrical member can be included in a tubing string used to transport a fluid.

At block 504, a port in fluid communication with the space is made through the wall. The port allows radial fluid flow through the wall of the tube or cylindrical assembly 208.

At block 506, a valve is constructed in the space to control a radial flow through the port and the wall of the tube. The valve is constructed within the space leaving the bore of the tube unencumbered by valve components. Since the valve is constructed within the space in the wall of the tube, not only the interior, but also the exterior of the tube is also left unencumbered by valve components. Thus, the low profile valve situated substantially with the wall of the tube does not impede the flow of fluids or the passing of tools through the inside of the tube, or near the exterior of the tube.

CONCLUSION

Although only a few example embodiments have been described in detail above, those skilled in the art will readily appreciate that many modifications are possible in the example embodiments without materially departing from the subject matter of low profile valves. Accordingly, all such modifications are intended to be included within the scope of this disclosure as defined in the following claims. In the claims, means-plus-function clauses are intended to cover the structures described herein as performing the recited function and not only structural equivalents, but also equivalent structures. For example, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

The invention claimed is:

1. An apparatus, comprising:
   a tubular member for fluid transport having an exterior circumference and a port; and
   a valve constructed within a wall of the tubular member for controlling a radial flow of a fluid through the port, the valve comprising:
      a valve member engagable with the port of the tubular member; and
      a force-applying member extending around the exterior circumference of the tubular member, the force-applying member capable of applying a force on the valve member to maintain engagement of the valve member with the port.

2. The apparatus of claim 1, wherein the tubular member comprises at least part of a string of tubes or pipes for transporting a hydrocarbon; and
   wherein the valve provides flow control from within a thin annulus between other components.

3. The apparatus of claim 1, wherein the tubular member comprises tubular components, which when assembled create a cylindrical assembly with an annular space envelope for the valve within the wall of the cylindrical assembly.

4. The apparatus of claim 3, wherein the cylindrical assembly is capable of being disassembled to access components of the valve within the wall.

5. The apparatus of claim 3, wherein the tubular member comprises two threaded tubular components, which when threaded together form the cylindrical assembly with the annular space envelope inside the wall of the cylindrical assembly.

6. The apparatus of claim 1, wherein the tubular member is selected from the group of tubular members consisting of a production tube, a transport pipe, a valve casing, a well casing, a pipe coupling, and a pipe joint.

7. The apparatus of claim 1, wherein the valve member is capable of contacting a seat on the port in the wall of the tubular member, the valve member moveable in a direction perpendicular to a direction of axial fluid flow in the tubular member.

8. The apparatus of claim 7, further comprising a guard or a shield to protect the valve from particulates in the fluid.

9. The apparatus of claim 7, wherein the seat is selected from a group of seats consisting of a port edge, an O-ring, an elastomeric seal, a tapered metal interface, and a metal-on-metal interface.

10. The apparatus of claim 7, wherein the valve member is held in place in a closed position against the port by the force-applying member until a pressure within the tubular member is greater than the force applied by the force-applying member.

11. The apparatus of claim 10, wherein the force-applying member is selected from a group of force-applying members consisting of a linear spring, a radial spring, a coiled spring, a leaf spring, a spring-loaded strap, a circumferential band, a bendable arm, a pivotable rocker arm, and a spring-loaded rocker arm.

12. An apparatus comprising:
    a tubular member for fluid transport, the tubular member having a port; and
    a valve constructed within a wall of the tubular member for controlling flow of a fluid through the port, the valve comprising:
       an arm having a first end and a second end, the arm rotatable about a pivot point;
       a valve member attached to, and moveable by, the arm, the valve member engagable with the port of the tubular member; and
       a force-applying member acting against an exterior of the tubular member and at least one end of the arm to maintain the engagement of the valve member with the port.

13. The apparatus of claim 12, wherein the tubular member comprises components that can be disassembled to access the valve member.

14. The apparatus of claim 13, wherein the components have a threaded end to connect to each other forming a space inside a wall of the connected components.

15. The apparatus of claim 12, wherein the tubular member is selected from the group of tubular members consisting of a well casing, a valve casing, a production tube, a transport pipe, a pipe coupling, and a pipe joint.

16. The apparatus of claim 12, wherein the valve member is capable of contacting a seat on the port.

17. The apparatus of claim 12, further comprising a guard or a shield to protect the valve from particulates in the fluid.

18. The apparatus of claim 12, wherein the force-applying member is a spring.

19. A method, comprising:
    providing a space within a wall of a fluid transporting tube;
    creating a port through the wall;
    including a valve member in the space to control a radial flow through the wall; and
    including a force-applying member extending about an exterior circumference of the tubular member, the force-applying member capable of applying a force on the valve member to maintain an engagement of the valve member with the port.

20. The method of claim 19, wherein the valve member is held in place in a closed position against the port by the force-applying member until a pressure within the tubular member is greater than the force applied by the force-applying member.

* * * * *